(12) United States Patent
Hwang

(10) Patent No.: US 10,328,794 B2
(45) Date of Patent: Jun. 25, 2019

(54) MULTI-PURPOSE UTILITY VEHICLE FOR CONSTRUCTION AND SNOW-REMOVING WORK

(71) Applicant: DAEDONG INDUSTRIAL CO., LTD., Daegu (KR)

(72) Inventor: Jin Ho Hwang, Changnyeong-gun (KR)

(73) Assignee: DAEDONG INDUSTRIAL CO., LTD., Daegu (KR)

( * ) Notice: Subject to any disclaimer, the term of this patent is extended or adjusted under 35 U.S.C. 154(b) by 197 days.

(21) Appl. No.: 15/416,001

(22) Filed: Jan. 26, 2017

(65) Prior Publication Data

US 2017/0225563 A1 Aug. 10, 2017

(30) Foreign Application Priority Data

Feb. 5, 2016 (KR) .......................... 10-2016-0015051

(51) Int. Cl.
| | |
|---|---|
| *B60K 17/28* | (2006.01) |
| *B60K 25/06* | (2006.01) |
| *B60K 17/354* | (2006.01) |
| *B60K 17/346* | (2006.01) |
| *B60K 17/08* | (2006.01) |
| *B60K 17/34* | (2006.01) |
| *B60K 17/22* | (2006.01) |
| *B60K 5/00* | (2006.01) |

(52) U.S. Cl.
CPC .............. *B60K 17/28* (2013.01); *B60K 17/08* (2013.01); *B60K 17/34* (2013.01); *B60K 17/346* (2013.01); *B60K 17/354* (2013.01); *B60K 25/06* (2013.01); *B60K 17/22* (2013.01); *B60K 2005/003* (2013.01); *B60K 2025/065* (2013.01); *B60Y 2200/124* (2013.01); *B60Y 2200/20* (2013.01); *B60Y 2400/72* (2013.01)

(58) Field of Classification Search
CPC ...... B60K 17/28; B60K 25/06; B60K 25/065; B60K 2025/065; B60Y 2400/72
USPC ................ 180/53.7, 53.1, 53.8; 74/15.66, 11
See application file for complete search history.

(56) References Cited

U.S. PATENT DOCUMENTS

| | | | |
|---|---|---|---|
| 8,950,525 B2 * | 2/2015 | Marotte ................. | B60K 25/06 180/53.7 |
| 2001/0014277 A1 * | 8/2001 | Braud ..................... | B60K 5/04 414/680 |
| 2015/0210163 A1 * | 7/2015 | Murakawa ............. | B60K 17/28 180/292 |

FOREIGN PATENT DOCUMENTS

KR 10-2012-0009216 A 2/2012

* cited by examiner

*Primary Examiner* — Keith J Frisby
(74) *Attorney, Agent, or Firm* — LRK Patent Law Firm

(57) ABSTRACT

A multi-purpose utility vehicle for construction and snow-removing work includes: a cargo box seated on a loading frame in the rear part of the vehicle; a continuously variable transmission combination mounted in a mounting space partitioned by a midship frame in the middle of a vehicle body; an engine assembly mounted in an engine room partitioned by a loading frame and base frames of the vehicle body at the back of the midship frame; a front wheel propeller shaft and a rear wheel propeller shaft which respectively transfer driving power outputted from the continuously variable transmission combination to a front axle combination of a front end of the vehicle body and a rear axle combination of a rear end of the vehicle body; and a PTO electromotive system extending from the front of the continuously variable transmission combination to the front of the vehicle body.

6 Claims, 4 Drawing Sheets

MULTI-PURPOSE UTILITY VEHICLE FOR CONSTRUCTION AND SNOW-REMOVING WORK

CROSS-REFERENCE TO RELATED APPLICATION

The present application claims the benefit of priority from Korean Patent Application No. 10-2016-0015051, filed in the Korean Intellectual Property Office on Feb. 5, 2016, the entire content of which is incorporated herein by reference.

BACKGROUND OF THE INVENTION

1. Field of the Invention

The present invention relates to a multi-purpose utility vehicle for construction and snow-removing work, and more particularly, to a multi-purpose utility vehicle for construction and snow-removing work which has a power takeoff (PTO) to draw out driving power outputted from an engine.

2. Description of Related Art

Small-sized multi-purpose utility vehicles (UTVs) have been widely used in various fields, such as distribution, construction, leisure and various industries. Particularly, the small-sized multi-purpose utility vehicles are mainly used as transportation means for carrying soil or crops in construction sites or agricultural lands or carrying various working tools because they are structurally favorable to off road driving.

Such a multi-purpose utility vehicle is equipped with a cargo box for the function as the transportation means. Like a dump car, the cargo box is formed in a dumping mechanism to tilt the cargo box back or return the cargo box to a horizontal state within a limited angle range based on a hinge in the rear part of the vehicle in order to load and unload loads fast.

In order to improve availability of the conventional multi-purpose utility vehicle limited to movement and conveyance, recently, development of multi-purpose utility vehicles, to each of which an working device of various types, for instance, a snowplow, is attached at the front or rear of the vehicle and a power takeoff (PTO) for actuating the working device by drawing out some of driving power of an engine is applied, has been made.

However, the conventional vehicle used for construction and snow-removing work has a disadvantage in that it is difficult to apply a front PTO for drawing out driving power toward the front of the vehicle within the limited design range due to a complicated frame structure.

SUMMARY OF THE INVENTION

Accordingly, the present invention has been made in view of the above-mentioned problems occurring in the prior art, and it is an object of the present invention to provide a multi-purpose utility vehicle for construction and snow-removing work to which a front power takeoff (PTO) is applied.

To accomplish the above object, according to the present invention, there is provided a multi-purpose utility vehicle for construction and snow-removing work including: a cargo box seated on a loading frame in the rear part of the vehicle; a continuously variable transmission combination mounted in a mounting space S partitioned by a midship frame in the middle of a vehicle body; an engine assembly mounted in an engine room partitioned by a loading frame and base frames of the vehicle body at the back of the midship frame; a front wheel propeller shaft and a rear wheel propeller shaft which respectively transfer driving power outputted from the continuously variable transmission combination to a front axle combination of a front end of the vehicle body and a rear axle combination of a rear end of the vehicle body; and a PTO electromotive system extending from the front of the continuously variable transmission combination to the front of the vehicle body so that some of the driving power from the continuously variable transmission combination can be drawn out of the front of the vehicle body.

Moreover, the PTO electromotive system includes: a PTO propeller shaft connected to a PTO driving shaft in the middle of the continuously variable transmission combination; and a PTO shaft some of which projects toward the front of the vehicle body and connected to the PTO propeller shaft.

Furthermore, the engine assembly is arranged in the engine room in a longitudinal direction of the vehicle body so that a flywheel faces the front of the vehicle body.

Additionally, the continuously variable transmission combination includes: a plurality of shifting elements for second shifting driving power first shifted by a hydrostatic transmission (HST); a PTO driving shaft for outputting driving power shifted by the shifting elements to the PTO electromotive system; a front wheel driving shaft for outputting driving power shifted by the shifting elements to the front wheel propeller shaft; and a rear wheel driving shaft for outputting driving power shifted by the shifting elements to the rear wheel propeller shaft.

Moreover, the PTO driving shaft and the front wheel driving shaft are arranged in parallel with each other.

In addition, the vehicle body includes: base frames; a front end suspension frame arranged at front end portions of the base frames to relieve shock at the front of the vehicle body; a dash board frame arranged at a rear end portion of the front end suspension frame for allowing mounting of a dash board; a midship frame mounted in the middle of the base frames to partition the mounting space (S); a loading frame arranged above the base frames at the back of the midship frame to support a cargo box; and a rear end suspension frame connected to rear end portions of the base frames to relieve shock at the back of the vehicle body.

As described above, the multi-purpose utility vehicle for construction and snow-removing work according to a preferred embodiment of the present invention can maximize availability of the vehicle in comparison with the conventional utility vehicles which are limited in movement and transportation and meet the needs of the market requiring various functions because the multi-purpose utility vehicle of the present invention includes the working device attached to the front of the vehicle, for instance, the PTO for actuating the snowplow.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
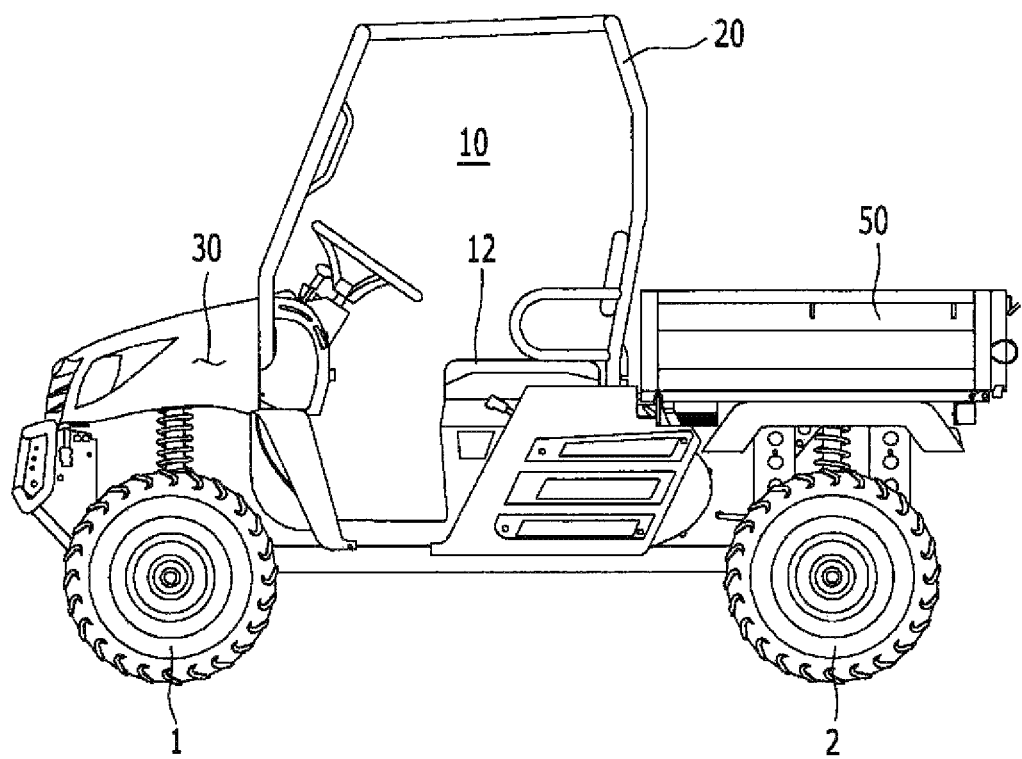
FIG. 1 is a side view of a multi-purpose utility vehicle for construction and snow-removing work according to a preferred embodiment of the present invention.

Hereinafter, exemplary embodiments of the present invention will be described with reference to the accompanying drawings.

It will be understood that the words or terms used in the present invention are used to describe specific embodiments of the present invention and there is no intent to limit the present invention. The singular form of the components may be understood into the plural form unless otherwise specifically stated in the context. It should be also understood that the terms of 'include' or 'have' in the specification are used to mean that there are characteristics, numbers, steps, operations, components, parts, or combinations of the steps, operations, components and parts described in the specification and there is no intent to exclude existence or possibility of other characteristics, numbers, steps, operations, components, parts, or combinations of the steps, operations, components and parts.

It will be further understood that terms, such as "first" or "second" may be used in the specification to describe various components but are not restricted to the above terms. The terms may be used to discriminate one component from another component.

In addition, the terms "section," "unit," and "module" used herein refer to a unit which can be embodied as hardware, software, or a combination thereof, for processing at least one function and performing an operation.

In description of the present invention referring to the accompanying drawings, those components that are the same or are in correspondence are rendered the same reference numeral regardless of the figure number, and redundant descriptions are omitted. In the description of the present invention, when it is judged that detailed descriptions of known technology related with the present invention may make the essential points vague, the detailed descriptions of the known functions or structures will be omitted.

Figure 2:
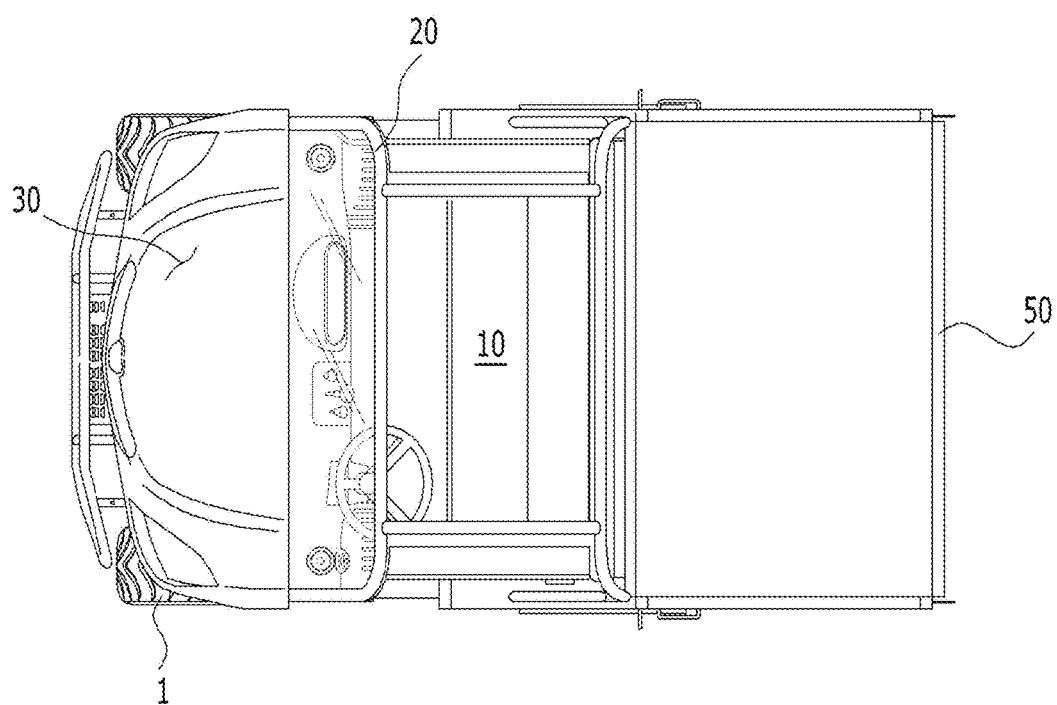
FIG. 2 is a plan view of the multi-purpose utility vehicle for construction and snow-removing work.

FIG. 1 is a side view of a multi-purpose utility vehicle for construction and snow-removing work according to a preferred embodiment of the present invention, and FIG. 2 is a plan view of the multi-purpose utility vehicle for construction and snow-removing work. Referring to the drawings, the outward appearance of the multi-purpose utility vehicle for construction and snow-removing work according to the preferred embodiment of the present invention will be described in brief.

Referring to FIGS. 1 and 2, a driver's seat 10 in which a driver and a fellow passenger can sit is disposed at the middle part of a vehicle body between front wheels 1 and rear wheels 2. The driver's seat 10 has a seat 12 for allowing the driver to take a seat, and in a space of the driver's seat 10 in front of the seat 12, a steering wheel (its reference numeral is omitted) for steering wheels of the vehicle and various operation switches for controlling running are arranged.

A rollover protective structure 20 surrounds the driver's seat 10 in order to protect the driver from rollover of the vehicle in safety, and a radiator room 30 surrounded by a bonnet is formed in front of the driver's seat 10. Moreover, a radiator (not shown) is mounted in the radiator room 30 in order to discharge some of heat generated from an engine assembly 40 to the outside through cooling water.

The engine assembly 40 (refer to FIG. 3) arranged in a space partitioned by a frame at the back of the seat 12 outputs driving power, and a cargo box 50 disposed to load loads is arranged on the frame at the back of the driver's seat 10. In this instance, the cargo box 50 is formed in a dumping mechanism to unload the loads at once by tilting the cargo box 50 toward the back of the vehicle body based on a hinge part of one side.

The driving power outputted from the engine assembly 40 is changed into speed suitable for running after passing through a continuously variable transmission combination 45 directly connected to the engine assembly 40 and is transferred to front wheels 1 and rear wheels 2 as running power (in case of a four-wheel vehicle), and some of the driving power is supplied as a power source for actuating a front working device attached to the front of the vehicle through an electromotive system (refer to FIG. 5) of a power takeoff (PTO).

Hereinafter, referring to FIGS. 3 to 5, arrangement and joining structure of the engine assembly and the continuously variable transmission combination and the structure of the motor of the PTO, which draws output of the engine assembly out of the vehicle in order to actuate the working device and a running electromotive system for transferring shifted driving power to the wheels will be described.

Figure 3:
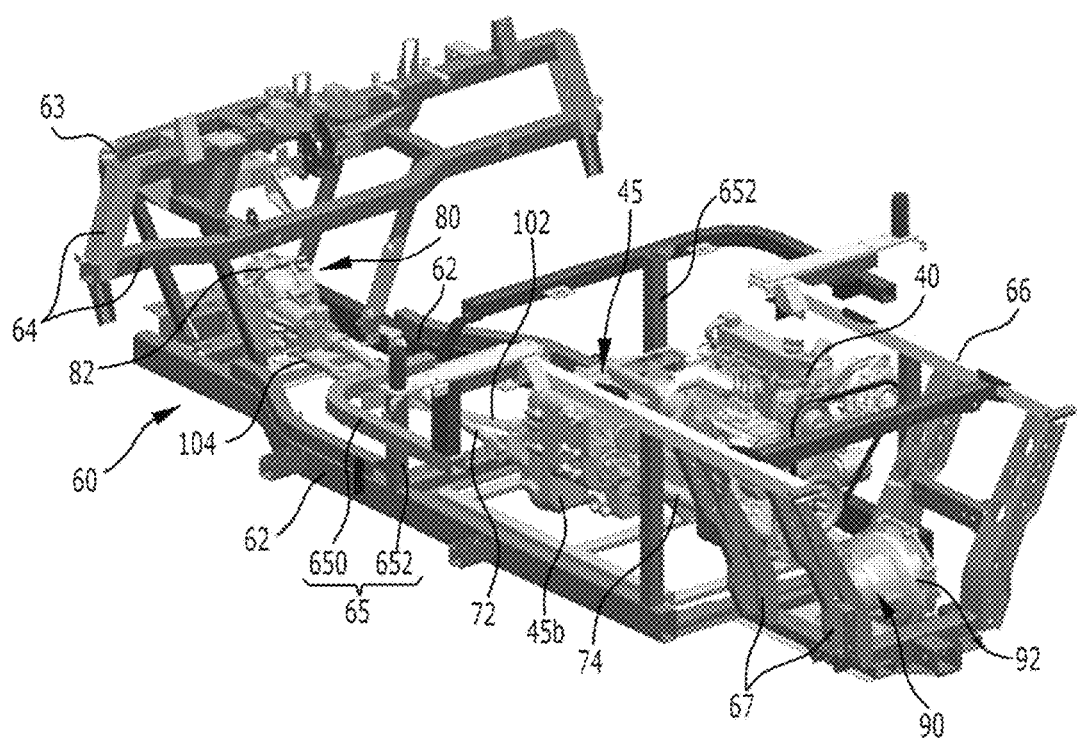
FIG. 3 is a perspective view of a body of the multi-purpose utility vehicle for construction and snow-removing work which has an engine assembly, a continuously variable transmission combination and a power transmission unit for transmitting shifting power to wheels and an working device.
Figure 4:
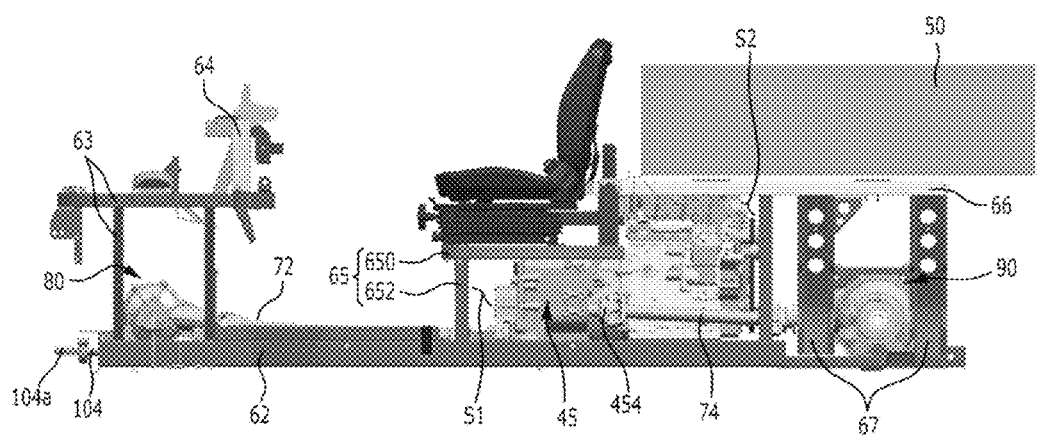
FIG. 4 is a side view of the body of the multi-purpose utility vehicle shown in FIG. 3.
Figure 5:
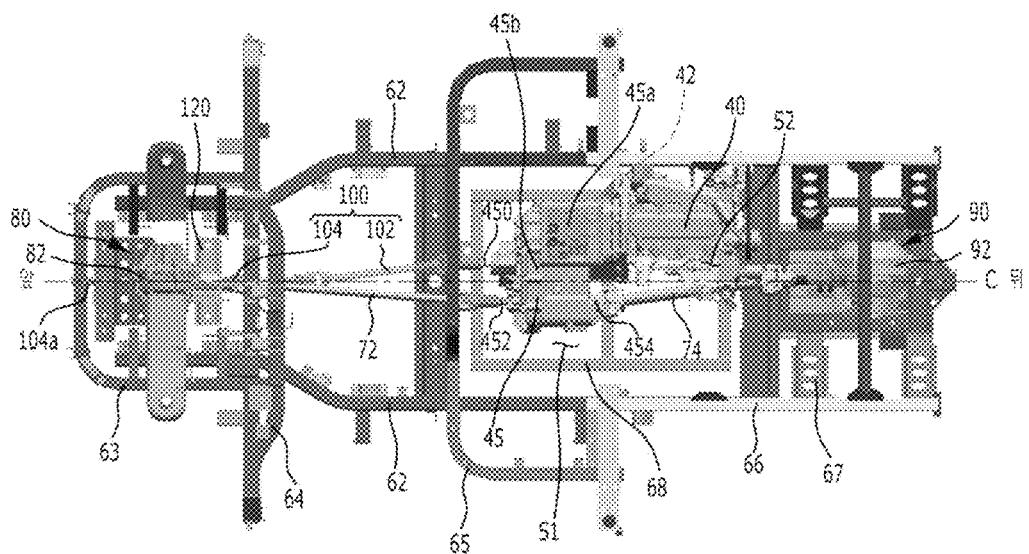
FIG. 5 is a plan view of the body of the multi-purpose utility vehicle shown in FIG. 3.

FIG. 3 is a perspective view of a body of the multi-purpose utility vehicle for construction and snow-removing work which has the engine assembly, the continuously variable transmission combination and the power transmission unit for transmitting shifting power to the wheels and the working device, and FIG. 4 is a side view and FIG. 5 is a plan view of the body of the multi-purpose utility vehicle shown in FIG. 3.

Referring to FIGS. 3 to 5, the vehicle body 60 includes: a pair of base frames 62 arranged at right and left in a longitudinal direction; a front end suspension frame 63 mounted at the front end portions of the base frames 62; and a dash board frame 64 connected to the back of the front end suspension frame 63 for mounting of a dash board.

A midship frame 65 is disposed in the middle of the base frame 62. The midship frame 65 includes a seat support frame 650 for supporting the seat and a plurality of connection rods 652 for connecting the seat support frame 650 to the base frame 62. A loading frame 66 which supports the cargo box is formed at the back of the midship frame 65 in a predetermined size.

A loading space S1 is formed in the midship frame 65 by the seat support frame 650 and the connection rods 652, and the continuously variable transmission combination 45 is mounted in the loading space S1 stably by a medium of a mounting stand 68.

In this instance, the mounting stand 68 is mounted to be located between a pair of the base frames 62 through a connection member (not shown) connected to the base frames 62, and a rear end suspension frame 67 is connected to a rear end portions of the base frames 62 to relieve the shock of the rear of the vehicle body 60.

The cargo box 50 is mounted on the loading frame 66 of the rear part of the vehicle body. The mounting stand 68 may be mounted stably in the engine room S2 partitioned by the loading frame 66 and the base frames 62 may be mounted stably or the engine assembly 40 may be mounted stably in the engine room S2 through a separate mounting member. The continuously variable transmission combination 45 is arranged in the mounting space S1 partitioned in front of the engine assembly 40.

The continuously variable transmission combination 45 outputs running power and driving power for the front working device by shifting driving power outputted from the engine assembly 40 into speed suitable for working or running. In this instance, an input shaft (not shown) of the continuously variable transmission combination 45 is directly connected to a flywheel 42 of the engine assembly 40 to transfer driving power outputted from the engine assembly 40 to the continuously variable transmission combination 45.

The engine assembly 40 is arranged in the longitudinal direction of the vehicle body in the engine room S2 so that the flywheel 42 faces the front of the vehicle body. The continuously variable transmission combination 45 is a combination of transmissions of different structures to realize the optimum shifting suitable for running or working conditions so that driving power outputted from the engine assembly 40 is shifted first and second.

A first transmission of the continuously variable transmission combination 45 for first shifting the driving power outputted from the engine assembly may be a well-known hydrostatic transmission 45a to determine rotation speed and direction of driving power, and a second transmission may be a manual type transmission 45b to carry out shifting by selecting pairs of gears with a desired rate of speed by a shifter.

The manual type transmission 45b which is the second transmission includes: a plurality of shifting elements (not shown) for second manual shifting of the driving power first shifted by the hydrostatic transmission, for instance, a shifter and a rotary shaft moving between the gears; and a PTO driving shaft 450 for outputting the driving power shifted by the shifting elements to the PTO electromotive system 100.

Furthermore, In order to output the driving power shifted by the shifting elements as driving power to actuate front wheels and rear wheels, the transmission includes a front wheel driving shaft 452 and a rear wheel driving shaft 454 which abut on the shifting element rotating by the finally shifted driving power, for instance, a final shifting shaft, or which are connected through a power transmission medium, such as a gear or a chain, to transmit driving power.

Some of the driving power outputted by the continuously variable transmission combination 45 is transferred to a front axle combination 80 through the front wheel propeller shaft 72 arranged to face a front head part of the vehicle body, and some is transferred to a rear axle combination 90 through the rear wheel propeller shaft 74 arranged to face a rear head part of the vehicle body. Additionally, the driving power is transferred to the front wheels 1 and the rear wheels 2 through the front axle combination 80 and the rear axle combination 90.

Each of the front wheel propeller shaft 72 and the rear wheel propeller shaft 74 includes: a shaft coupling element having a pair of yokes and a cross shaft for connecting the yokes with each other; and a shaft element having input shafts respectively spline-connected to the driving shafts 452 and 454 to absorb a change in length according to running conditions and steel pipe type propeller shafts respectively connected to the input shafts through the shaft coupling element.

Some of the driving power shifted by the continuously variable transmission combination 45 is drawn out of the vehicle body through the PTO electromotive system 100. In more detail, some of the driving power which is shifted by the continuously variable transmission combination 45 and is branched through the PTO driving shaft 450 to be drawn out may be used as driving power for operating the front working device by being drawn out toward the front of the vehicle body.

In detail, the PTO electromotive system 100 includes a PTO propeller shaft 102 which is connected to the PTO driving shaft 450 in the middle of the continuously variable transmission combination 45 to rotate by the driving power outputted by the PTO driving shaft 450; and a PTO shaft 104 connected to the PTO propeller shaft 102 so that a part of an output terminal 104a protrudes toward the front of the vehicle body.

The PTO shaft 104 is fixed on the front end suspension frame 63 by a connection member (not shown) and is rotatably supported at a supporter 120 having a bearing, and the PTO propeller shaft 102 includes a shaft coupling element and a shaft element having input shafts and propeller shafts like the front wheel propeller shaft 72 and the rear wheel propeller shaft 74.

The PTO driving shaft 450 and the front wheel driving shaft 452 which face the front part of the vehicle body are arranged to be parallel to each other.

In this instance, the PTO driving shaft 450 is located adjacent to a vehicle width center C, and the front wheel driving shaft 452 is located at a side of the PTO driving shaft 450 spaced apart from the vehicle width center C at a predetermined distance (to the left from the vehicle width center in FIG. 4).

The rear wheel driving shaft 454 is formed in the opposite direction to the front wheel driving shaft 452, and the engine assembly 40 is located at the opposite side of the front wheel driving shaft based on the vehicle width center C (to the right from the vehicle width center in FIG. 4) in consideration of balance of whole weight of the vehicle considering joining with the continuously variable transmission combination 45, positions of input terminals of the front wheel driving shaft 452, the rear wheel driving shaft 454, the front wheel propeller shaft 72 and the rear wheel propeller shaft 74.

In the meantime, the front axle combination 80 includes a front differential unit 82 and the rear axle combination 90 includes a rear differential unit 92, which are respectively arranged in the middle of the front axle and the rear axle (not shown) disposed at right and left in pairs to distribute the driving power respectively receiving from the front wheel propeller shaft 72 and the rear wheel propeller shaft 74 to right and left according to load conditions of the vehicle axles.

As described above, the multi-purpose utility vehicle for construction and snow-removing work according to the preferred embodiment of the present invention can maximize availability of the vehicle in comparison with the conventional utility vehicles which are limited in movement and transportation and meet the needs of the market requiring various functions because the multi-purpose utility vehicle of the present invention includes the working device attached to the front of the vehicle, for instance, the PTO for actuating the snowplow.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A multi-purpose utility vehicle for construction and snow-removing work, comprising:
   a continuously variable transmission combination mounted in a mounting space (S1) partitioned by a midship frame in the middle of a vehicle body;
   an engine assembly mounted in an engine room partitioned by a loading frame and base frames of the vehicle body at the back of the midship frame;
   a front wheel propeller shaft and a rear wheel propeller shaft which respectively transfer driving power outputted from the continuously variable transmission combination to a front axle combination of a front end of the vehicle body and a rear axle combination of a rear end of the vehicle body; and
   a PTO electromotive system extending from the front of the continuously variable transmission combination to the front of the vehicle body so that some of the driving power from the continuously variable transmission combination can be drawn out of the front of the vehicle body.

2. The multi-purpose utility vehicle according to claim 1, wherein the PTO electromotive system comprises:
   a PTO propeller shaft, connected to a PTO driving shaft in the middle of the continuously variable transmission combination; and
   a PTO shaft some of which projects toward the front of the vehicle body and connected to the PTO propeller shaft.

3. The multi-purpose utility vehicle according to claim 1, wherein the engine assembly is arranged in the engine room in a longitudinal direction of the vehicle body so that a flywheel faces the front of the vehicle body.

4. The multi-purpose utility vehicle according to claim 1, wherein the continuously variable transmission combination comprises:
   a manual type transmission for second shifting driving power first shifted by a hydrostatic transmission (HST);
   a PTO driving shaft for outputting driving power shifted by the manual type transmission to the PTO electromotive system;
   a front wheel driving shaft for outputting driving power shifted by the manual type transmission to the front wheel propeller shaft; and
   a rear wheel driving shaft for outputting driving power shifted by the manual type transmission to the rear wheel propeller shaft.

5. The multi-purpose utility vehicle according to claim 4, wherein the PTO driving shaft and the front wheel driving shaft are arranged in parallel with each other.

6. The multi-purpose utility vehicle according to claim 1, wherein the vehicle body comprises:
   base frames;
   a front end suspension frame arranged at front end portions of the base frames to relieve shock at the front of the vehicle body;
   a dash board frame arranged at a rear end portion of the front end suspension frame for allowing mounting of a dash board;
   a midship frame mounted in the middle of the base frames to partition the mounting space (S1);
   a loading frame arranged above the base frames at the back of the midship frame to support a cargo box; and
   a rear end suspension frame connected to rear end portions of the base frames to relieve shock at the back of the vehicle body.

* * * * *